United States Patent
Coupigny et al.

(10) Patent No.: US 8,019,985 B2
(45) Date of Patent: Sep. 13, 2011

(54) DATA-PROCESSING ARRANGEMENT FOR UPDATING CODE IN AN AUXILIARY PROCESSOR MEMORY

(75) Inventors: Jean-Paul Coupigny, Peymeinade (FR); Olivier Mielo, Saint Laurent du Var (FR)

(73) Assignee: ST-Ericsson SA, Geneva (CH)

( * ) Notice: Subject to any disclaimer, the term of this patent is extended or adjusted under 35 U.S.C. 154(b) by 713 days.

(21) Appl. No.: 11/813,283

(22) PCT Filed: Dec. 16, 2005

(86) PCT No.: PCT/IB2005/054286
§ 371 (c)(1),
(2), (4) Date: Jun. 2, 2008

(87) PCT Pub. No.: WO2006/070306
PCT Pub. Date: Jul. 6, 2006

(65) Prior Publication Data
US 2009/0077364 A1    Mar. 19, 2009

(30) Foreign Application Priority Data
Dec. 30, 2004  (EP) .................................. 04300954

(51) Int. Cl.
*G06F 15/177* (2006.01)
(52) U.S. Cl. ........................................... 713/2
(58) Field of Classification Search .................. 713/2, 1
See application file for complete search history.

(56) References Cited

U.S. PATENT DOCUMENTS

| | | | |
|---|---|---|---|
| 3,587,060 A * | 6/1971 | Quinn et al. ................. | 710/317 |
| 4,707,803 A * | 11/1987 | Anthony et al. ............. | 703/25 |
| 4,943,911 A | 7/1990 | Kopp et al. | |
| 5,297,260 A * | 3/1994 | Kametani ..................... | 710/113 |
| 5,497,497 A | 3/1996 | Miller et al. | |
| 5,754,863 A | 5/1998 | Reuter | |
| 5,757,639 A | 5/1998 | Yamada | |
| 2001/0020269 A1 | 9/2001 | Kawade et al. | |

FOREIGN PATENT DOCUMENTS

| | | |
|---|---|---|
| EP | 0581698 A1 | 2/1994 |
| WO | 0127753 A2 | 4/2001 |

* cited by examiner

*Primary Examiner* — Thomas Lee
*Assistant Examiner* — Eric Chang
(74) *Attorney, Agent, or Firm* — William J. Kubida; Peter J. Meza; Hogan Lovells US LLP

(57) ABSTRACT

A data-processing arrangement includes a main processor and an auxiliary processor. A system-program code causes the main processor to write an application-program code into a shared memory. The system-program code further causes the main processor to write an address indication, which indicates where the application-program code has been written into the shared memory, into a predefined memory location. A startup-program code causes the auxiliary processor to retrieve the address indication from the predefined memory location so as to subsequently transfer the application-program code from the shared memory to an application-program memory, which belongs to the auxiliary processor.

10 Claims, 4 Drawing Sheets

DATA-PROCESSING ARRANGEMENT FOR UPDATING CODE IN AN AUXILIARY PROCESSOR MEMORY

FIELD OF THE INVENTION

An aspect of the invention relates to a data-processing arrangement that comprises a main processor and an auxiliary processor, which has an application-program memory. The data-processing arrangement may be, for example, a multi-processor system for a cellular phone. The main processor may carry out various operations that relate to a user control or a system control, or both. The auxiliary processor may carry out various digital-signal processing operations for decoding received signals or for coding signals to be transmitted, or both. Other aspects of the invention relate to a method of downloading an application-program code, a computer-program product, and a communication apparatus.

DESCRIPTION OF PRIOR ART

U.S. Pat. No. 5,754,863 describes a master microprocessor that downloads program codes to a slave microprocessor, which does not require a read-only memory (ROM) containing any instruction codes. While downloading, the slave microprocessor reads the program instructions to execute from a register, which is written to by the master microprocessor. The execution of these instructions causes the slave microprocessor to write program instructions to its random-access memory (RAM), which will be executed later in normal operation. The slave microprocessor has a handshaked bus which causes it to terminate a read from the register only after the master microprocessor has written to it. Logic, preferably a programmable array logic (PAL) device, decodes addresses and generates the "READY" handshake bus signal for the slave microprocessor.

SUMMARY OF THE INVENTION

According to an aspect of the invention, a data-processing arrangement, which comprises a main processor and an auxiliary processor, has the following characteristics. A system-program code causes the main processor to write an application-program code into a shared memory. The system-program code further causes the main processor to write an address indication, which indicates where the application-program code has been written into the shared memory, into a predefined memory location. A startup-program code causes the auxiliary processor to retrieve the address indication from the predefined memory location so as to subsequently transfer the application-program code from the shared memory to an application-program memory, which belongs to the auxiliary processor.

The invention takes the following aspects into consideration. In a data-processing arrangement that comprises a main processor and an auxiliary processor, the main processor typically carries out global, system-related operations and the auxiliary processor typically carries out one or more specific tasks. An application program defines these tasks. The application program is typically in the form of so-called embedded software, which is a machine-code version of the application program that is stored in a program memory of the auxiliary processor.

The application program may be relatively complex. This is particularly true if the program memory of the auxiliary processor is relatively large so that the program memory can store relatively much embedded software. The more complex the application program is, the more likely it is that an early version comprises one or more errors, so-called bugs. This is particularly true if the application program needs to be developed in relatively short time for reasons of, for example, time-to-market. Moreover, a fast market introduction increases the risk that a bug is detected only after relatively many samples of the data-processing arrangement have already been sold. Nevertheless, correction of a bug may be required by, for example, replacing the early version of the application program by a more recent, mature version.

It is possible to design the data-processing arrangement so that the main processor has direct access to the application-program memory and can take full control over the application-program memory. Accordingly, the main processor can write a new version of the application program into the application-program memory so as to correct one or more bugs. However, such a design requires special hardware and software and is not very flexible. Consequently, the design will be relatively time-consuming and costly.

Another solution is to store the application program in a volatile memory, such as, for example, a static random access memory. The main processor causes the application program to be stored into the volatile memory each time the data-processing arrangement is activated. The auxiliary processor is provided with special hardware in the form of the programmable logic array, which forces the auxiliary processor to execute successive commands that the main processor provides. These commands cause the application program to be stored into the volatile memory. The aforementioned prior art appears to describe such a solution. This solution requires special hardware, which is not very flexible. The systematic download of the application program into the volatile memory may render the data-processing arrangement slow. What is more, volatiles memories are relatively costly.

In accordance with the aforementioned aspect of the invention, the main processor writes the application-program code into the shared memory and, in addition, the address indication, which indicates where the application-program code has been written into the shared memory, into the predefined memory location. The startup-program code causes the auxiliary processor to retrieve the address indication from the predefined memory location so as to subsequently transfer the application-program code from the shared memory to the application-program memory.

The startup-program code, which is typically carried out after a reset, can be relatively simple. It is sufficient that the startup-program code checks the predefined memory location to see if there is any address indication. The startup-program code need not know beforehand where the application-program code, which needs to be downloaded, is stored. The startup-program code may simply cause a jump to the application-program code if there is no address indication. The startup-program code is therefore generic and, as a result, can be used in a great variety of data-processing arrangements. The startup-program code can be stored in a relatively small read-only memory. What is more, the invention does not require very specific hardware. The invention uses to advantage the shared memory, which is an entity that many data-processing arrangements of the multiprocessor type include. For those reasons, the invention allows a flexible and cost-efficient upgrade of the application-program code.

These and other aspects of the invention will be described in greater detail hereinafter with reference to drawings.

DETAILED DESCRIPTION

Figure 1:
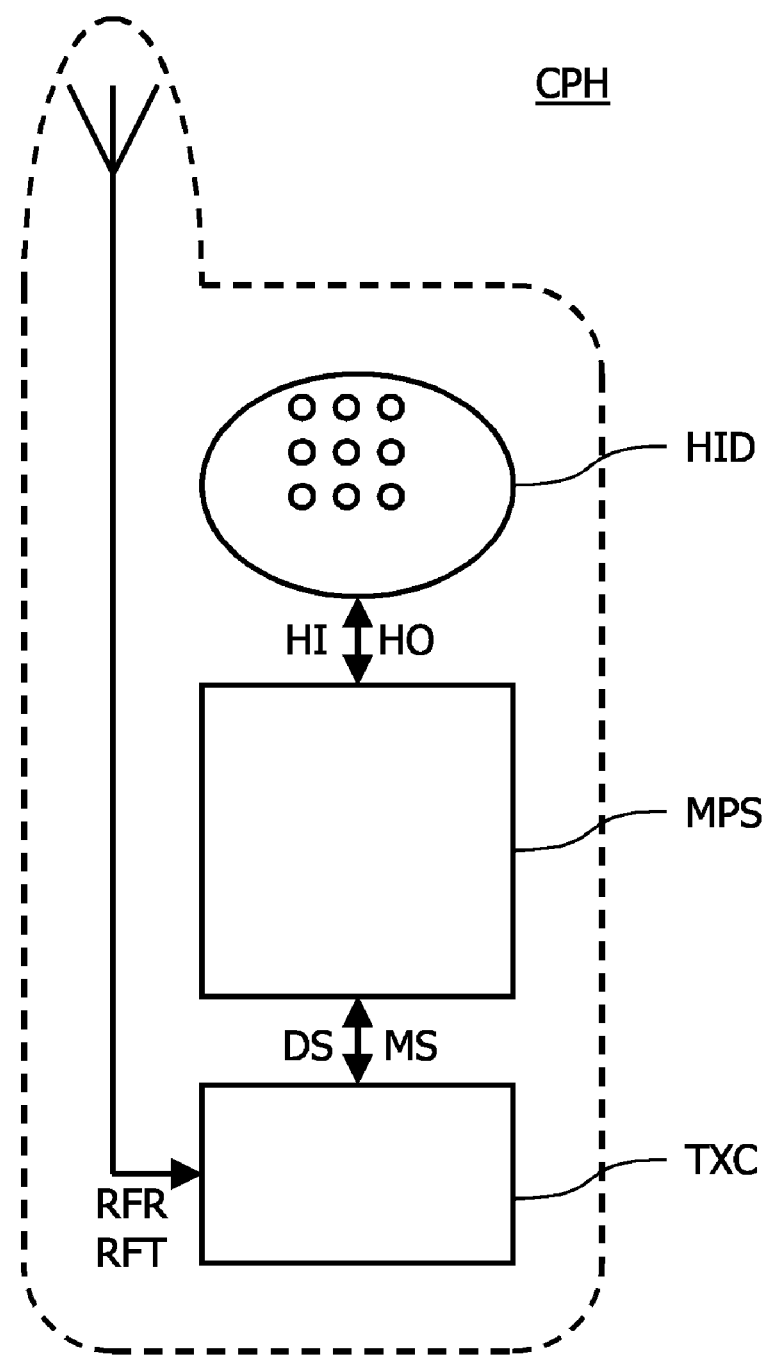
FIG. 1 is a block diagram that illustrates a cellular phone.

FIG. 1 illustrates a cellular phone CPH. The cellular phone CPH comprises a transmitter-and-receiver circuit TXC, a multiprocessor system MPS, and human interface devices HID. The human interface devices HID typically comprise a small loudspeaker, a small microphone, a display device, and a numerical keyboard for dialing a number.

The multiprocessor system MPS carries out operations that relate to a user control or a system control of a cellular-phone communication, or both. For example, let it be assumed that a user instructs the cellular phone CPH to setup a call with a particular phone number. The multiprocessor system MPS handles this process by, for example, displaying a personal phone book if the user so requests. The multiprocessor system MPS also carries out various operations that are needed to set up the call. For example, in a Global System for Mobile Communication (GSM), the multiprocessor system MPS typically handles GSM system-level operations, which involves signaling and time-slot management.

In a reception mode, the transmitter-and-receiver circuit TXC provides a demodulation signal DS in response to a received radiofrequency signal RFR. The multiprocessor system MPS processes the demodulation signal DS, which may comprise data from a calling party or data from a base station or another cellular-phone network entity, or any combination of such data. For example, the multiprocessor system MPS may derive a human-interface input signal HI from the demodulation signal DS. The human-interface input signal HI may be, for example, an audio signal for the small loudspeaker. This demodulation-signal processing typically comprises one or more channel-decoding operations and one or more error-correction operations, such as, for example, a Viterbi decoding.

In a transmission mode, there is an opposite signal flow, which starts with a human-interface output signal HO. For example, the multiprocessor system MPS may receive an audio signal that the small microphone provides in response to a spoken word. The multiprocessor system MPS processes the human-interface output signal HO so as to obtain a modulation signal MS. This modulation-signal processing typically comprises one or more channel-coding operations and one or more error-coding operations, which are complementary with those in the demodulation-signal processing described hereinbefore. The transmitter-and-receiver circuit TXC emits a transmission radiofrequency signal RFT, which comprises the modulation signal MS.

Figure 2:
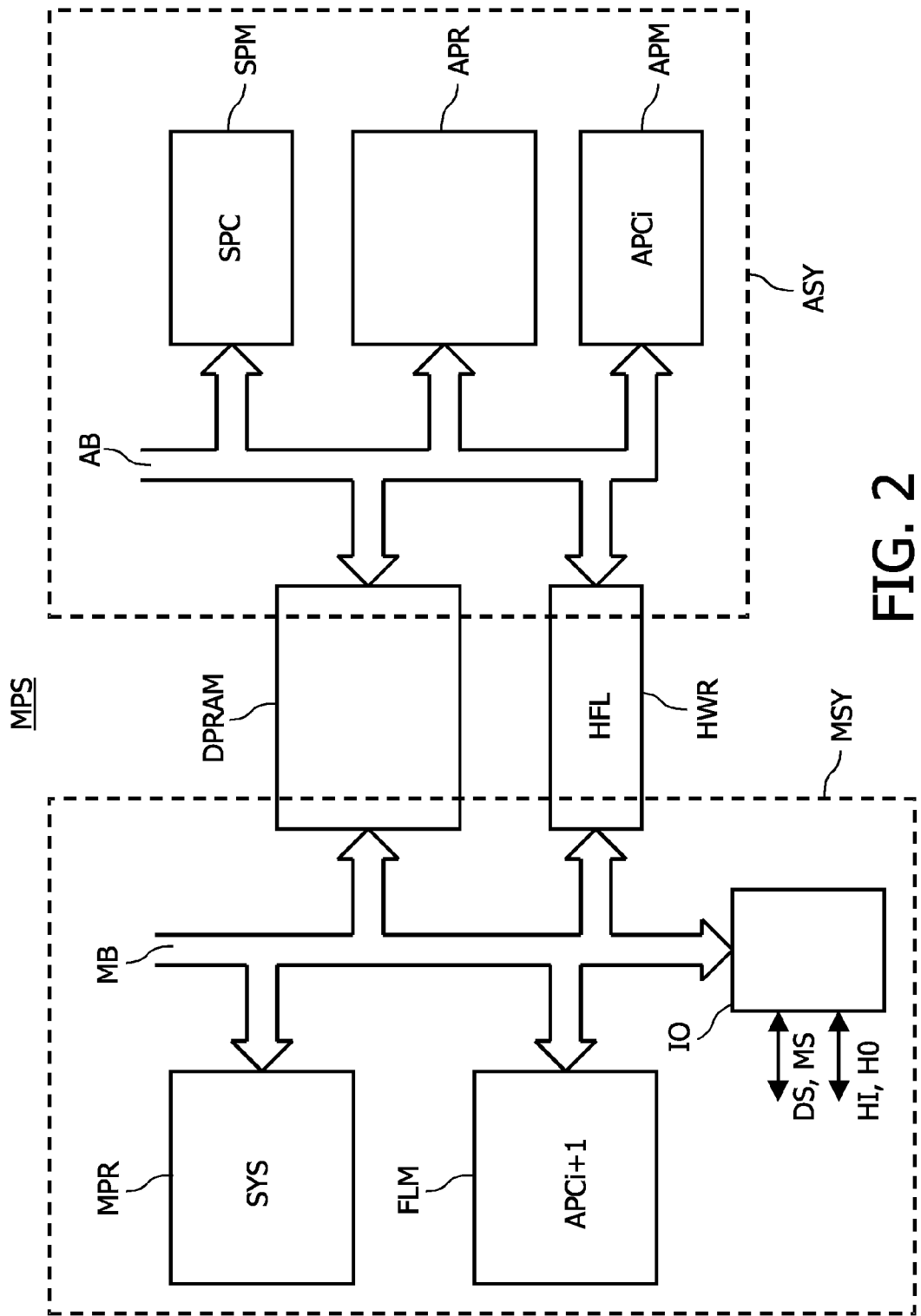
FIG. 2 is a block diagram that illustrates a multiprocessor system of the cellular phone.

FIG. 2 illustrates the multiprocessor system MPS. The multiprocessor system MPS comprises a main-system part MSY and an auxiliary-system part ASY. The main-system part MSY carries out operations that relate to user control and to system control, which have been described hereinbefore. The auxiliary-system part ASY carries out operations that relate to demodulation-signal processing and modulation-signal processing, which have been described hereinbefore. For example, the auxiliary-system part ASY may carry out a Viterbi decoding.

The main-system part MSY comprises a main processor MPR, a flash memory FLM, an input-output interface 10, and a main-system bus MB. The auxiliary-system part ASY comprises an auxiliary processor APR, an application-program memory APM, a startup-program memory SPM, and an auxiliary-system bus AB. The main-system part MSY and the auxiliary-system part ASY share two resources: a dual-port random-access memory DPRAM and a set of hardware registers HWR. The respective functions of the aforementioned entities will now briefly be described.

In the main-system part MSY, the main processor MPR has a system-program code SYS. The system-program code SYS defines operations relating to user control and system control, which have been mentioned hereinbefore. The main processor MPR can be regarded as a master of the multiprocessor system MPS.

The flash memory FLM can store a relatively large amount of data that may be comprised in the demodulation signal DS. For example, the cellular phone CPH may communicate with a software-distribution center so as to download a software program via a cellular-phone network. The software program, which is downloaded, is stored in the flash memory FLM.

The main-system bus MB allows the main processor MPR, the flash memory FLM, and the input-output interface 10 to communicate with each other. The main-system bus MB also allows the aforementioned entities to access the dual-port random-access memory DPRAM and the set of hardware registers HWR.

The input-output interface 10 adapts the human-interface output signal HO so that this signal can be transferred over the main-system bus MB. Conversely, the input-output interface 10 adapts a main-bus signal so that this signal constitutes the human-interface input signal HI, which has a particular format. The input-output interface 10 makes similar adaptations for the demodulation signal DS and the modulation signal MS.

In the auxiliary-system part ASY, the startup-program memory SPM comprises a startup-program code SPC that the auxiliary processor APR executes in response to a reset signal, or an equivalent signal. The startup-program code SPC is preferably fixed in the sense that the startup-program code SPC does not change during a lifetime of the multiprocessor system MPS. Consequently, the startup-program memory SPM may be in the form of a non-reprogrammable read only memory (ROM).

The application-program memory APM serves to store an application-program code APCi. The application-program code APCi may need to be updated one or more times during the lifetime of the multiprocessor system MPS. That is, a version of the application-program code APCi, which is present in the application-program memory APM, may need to be replaced by an updated version APCi+1. Consequently, the application-program memory APM needs to be reprogrammable, in contradistinction with the startup-program memory SPM. The application-program memory APM may be in the form of, for example, an electrically erasable programmable read only memory (EEPROM), which is a non-volatile memory.

The auxiliary-system bus AB allows the auxiliary processor APR, the startup-program memory SPM, and the application-program memory APM to communicate with each other. The auxiliary-system bus AB also allows the aforementioned entities to access the dual-port random-access memory DPRAM and the set of hardware registers HWR. The auxiliary-system bus AB may have properties that are different from the main-system bus MB in terms of, for example, data width and data transfer speed. In that respect, it should be noted that the main-system part MSY and the auxiliary-system part ASY may have different system clocks. Each part operates and communicates at its own pace.

The dual-port random-access memory DPRAM allows a data exchange between the main-system part MSY and the auxiliary-system part ASY. Each part can individually access the dual-port random-access memory DPRAM. For example, the main processor MPR may cause a transfer of data from the flash memory FLM to the dual-port random-access memory DPRAM. The auxiliary-system part ASY may subsequently pick up, as it were, the data that the main processor MPR has placed in the dual random access memory. For example, the auxiliary processor APR may transfer the data to the application-program memory APM or any other programmable memory that is coupled to the auxiliary-system bus AB.

The set of hardware registers HWR allows the auxiliary-system part ASY to signal a particular event to the main-system part MSY, and vice versa. Such signaling can be used to achieve, for example, synchronization. The set of hardware registers HWR comprises a hard flag HFL, which FIG. 2 illustrates. The auxiliary processor APR may set this hard flag HFL. The main processor MPR will receive an interrupt when the hard flag HFL is set. Accordingly, the hard flag HFL allows the auxiliary processor APR to present an interrupt to the main processor MPR.

The multiprocessor system MPS may be implemented as a so-called system-on-chip, which is based on existing integrated-circuit designs for the various entities described hereinbefore. A composition of these existing integrated-circuit designs is made. A designer may adapt an existing integrated-circuit design if necessary. This allows a relatively fast design because relatively few circuits have to be designed and tested from scratch.

In the description hereinafter, it is assumed that the cellular phone CPH has received an updated version of the application-program code APCi+1. The updated version has temporarily been stored in the flash memory FLM. The main processor MPR, which has detected that the updated version has been received, transfers the updated version of the application-program code APCi+1 to the dual-port random-access memory DPRAM.

Figure 3:
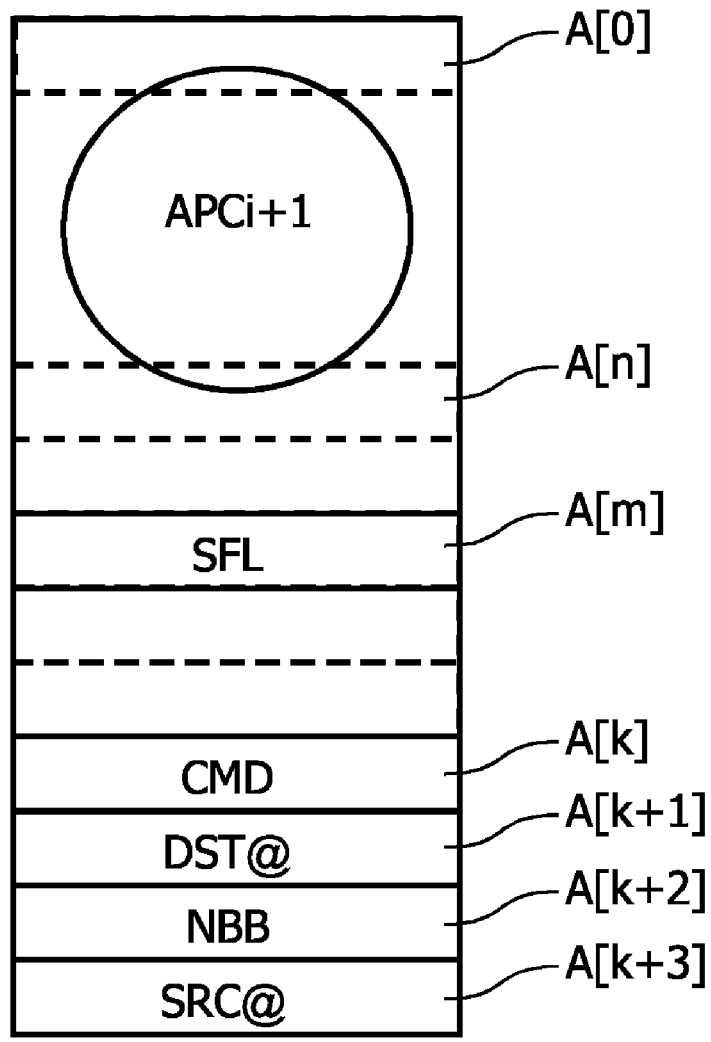
FIG. 3 is a conceptual diagram that illustrates a dual-port random-access memory in the multiprocessor system.

FIG. 3 illustrates the dual-port random-access memory DPRAM. The dual-port random-access memory DPRAM comprises the updated version of the application-program code APCi+1, which has been mentioned hereinbefore. The updated version is stored in a range of addresses A[0] . . . A[n]. The dual-port random-access memory DPRAM further comprises a soft flag SFL, which is stored under address A[m].

There are four addresses A[k] . . . A[k+3] that have specifically been assigned to storage of data for the auxiliary processor APR. More specifically, address A[k] has been assigned to store a command CMD for the auxiliary processor APR. The other three addresses A[k+1] . . . A[k+3] have been assigned to store attributes of the command CMD. For example, a read command may have the following attributes: a start address SRC@ of the data to be read, a number of bytes to be read NBB, and a destination address DST@ where the data that has been read should be written. FIG. 3 illustrates these attributes, which the dual-port random-access memory DPRAM stores under addresses A[k+3], A[k+2], and A[k+1], respectively.

Figure 4:
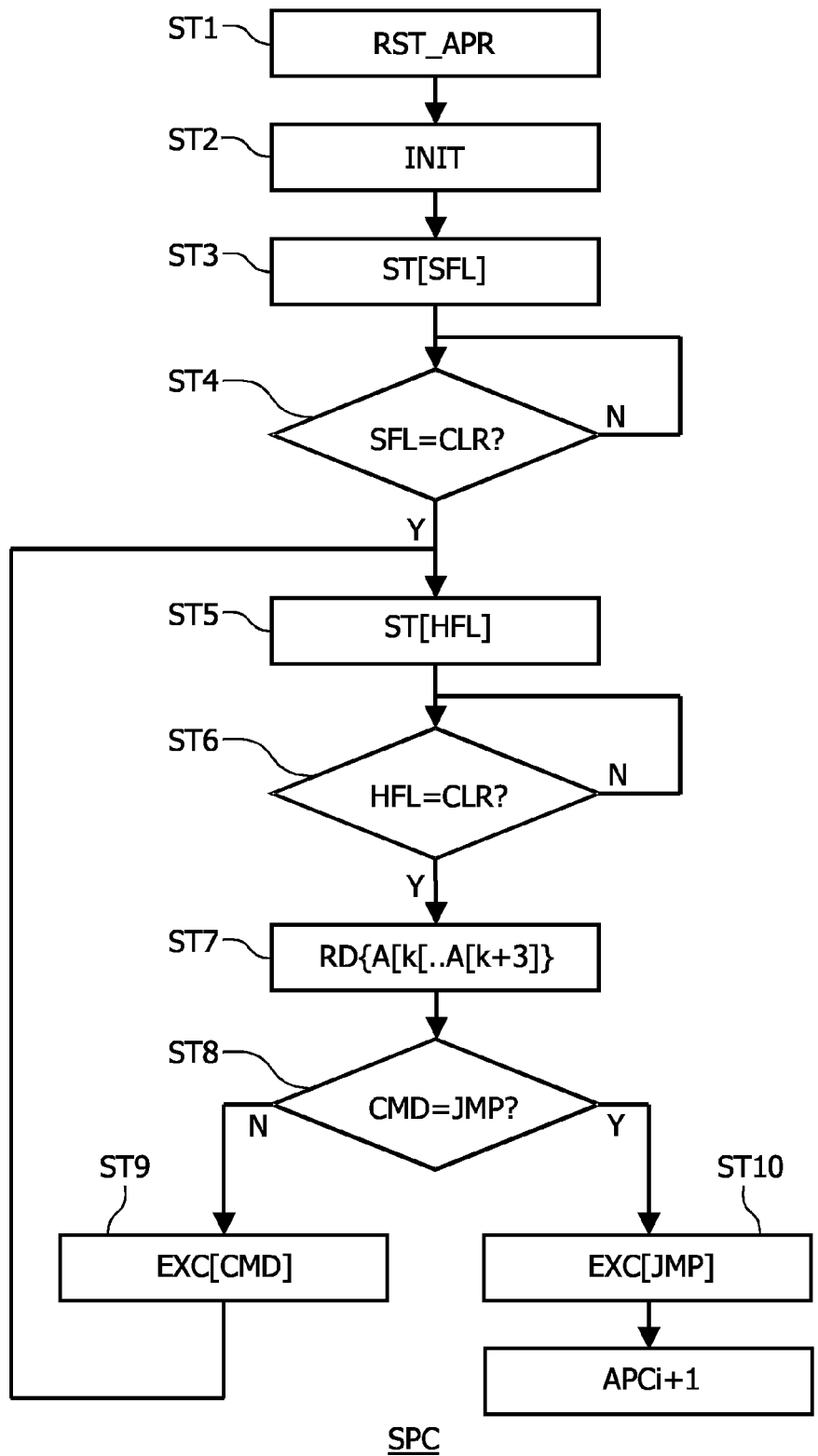
FIG. 4 is a flow chart diagram that illustrates a startup-program code for an auxiliary processor in the multiprocessor system.

FIG. 4 illustrates the startup-program code SPC, which is stored in the startup-program memory SPM that belongs to the auxiliary processor APR. The startup-program code SPC causes the auxiliary processor APR to carry out various operations. FIG. 4 illustrates these various operations in the form of a series of steps ST1-ST10. The auxiliary processor APR will execute the startup-program code SPC in response to a reset signal, which may originate from the main processor MPR as mentioned hereinbefore.

Step ST1 marks the beginning of the startup-program code SPC, which is stored at a start address of the startup-program memory SPM. The auxiliary processor APR has detected a reset signal, or a signal equivalent thereto (RST_APR). In response, the auxiliary processor APR, which has a program counter, sets the program counter to the start address of the startup-program memory SPM.

In step ST2, the auxiliary processor APR carries out various initialization operations (INIT), which are typically comprised in a reboot process. For example, the auxiliary processor APR may place various internal registers in a desired initial state.

In step ST3, the auxiliary processor APR sets the soft flag SFL in the dual-port random-access memory DPRAM (ST [SFL]). The main processor MPR regularly checks the soft flag SFL so as to detect whether the auxiliary processor APR has set the soft flag SFL. When the soft flag SFL is set, the main processor MPR interprets this as a signal that the auxiliary processor APR has started to execute the startup-program code SPC. Subsequently, the main processor MPR clears the soft flag SFL. This signals the auxiliary processor APR that the main processor MPR is aware, as it were, that the auxiliary processor APR executes the startup-program code SPC.

In step ST4, the auxiliary processor APR checks whether the main processor MPR has cleared the soft flag SFL (SFL=CLR?). The auxiliary processor APR carries out step ST4 anew when the main processor MPR has not yet cleared the soft flag SFL (N). Consequently, the auxiliary processor APR remains in a waiting loop until the main processor MPR has cleared the soft flag SFL. The auxiliary processor APR leaves this waiting loop when, in step ST4, the auxiliary processor APR detects that the main processor MPR has cleared the soft flag SFL (Y).

In step ST5, the auxiliary processor APR sets the hard flag HFL in the set of hardware registers HWR (ST[HFL]). As a result, the main processor MPR receives an interrupt signal from the hardware register in which the hard flag HFL is stored, as explained hereinbefore. The main processor MPR interprets this interrupt signal is a request for a command, which the auxiliary processor APR requires. In response, the main processor MPR writes a command into address A[k]. In addition, the main processor MPR may write one or more attributes into the three other addresses A[k+1] . . . A[k+3], which have specifically been assigned to that purpose. Subsequently, the main processor MPR clears the hard flag HFL, which has generated the interrupt signal. This signals the auxiliary processor APR that the command, which has been requested, is present in the dual-port random-access memory DPRAM at the predefined location, which are addresses A[k] . . . A[k+3], including the attributes.

In step ST6, the auxiliary processor APR checks whether the main processor MPR has cleared the hard flag HFL (HFL=CLR?). The auxiliary processor APR carries out step ST6 anew when the main processor MPR has not yet cleared the hard flag HFL (N). Consequently, the auxiliary processor APR remains in a waiting loop until the main processor MPR has cleared the hard flag HFL. The auxiliary processor APR leaves this waiting loop when the auxiliary processor APR detects in step ST6 that the main processor MPR has cleared the hard flag HFL (Y).

In step ST7, the auxiliary processor APR reads data that is stored in the dual-port random-access memory DPRAM under addresses A[k] ... A[k+3] (RD {A[k] ... A[k+3]}). This data is the command and attributes, if any, that the main processor MPR has stored on request. FIG. 3 illustrates this. The auxiliary processor APR stores the command and attributes in, for example, internal registers that form part of the auxiliary processor APR.

In step ST8, the auxiliary processor APR checks whether the command is a jump command (CMD=JMP?). The auxiliary processor APR executes the command in step ST9 (EXC [CMD]) and, subsequently, carries out step ST5 anew if the command is not a jump command (N). In case the command is a jump command (Y), the auxiliary processor APR executes the jump command in step ST10 (EXC[JMP]). This marks the end of the execution of the startup-program code SPC. For example, the jump command may have a jump address attribute, which the main processor MPR has stored under address A[k+1]. The jump address attribute may specify a start address of the updated version of application-program code APC. In that case, the auxiliary processor APR starts to execute the updated version of the application-program code APCi+1 subsequent to step ST10. FIG. 4 illustrates this.

Steps ST5-ST9 constitute a command-execution loop. The auxiliary processor APR remains in this command-execution loop until the auxiliary processor APR receives a jump command. The auxiliary processor APR requests the main processor MPR to provide a command each time the auxiliary processor APR goes through the command-execution loop. This request occurs in step ST5. Step ST6, in combination with step ST5, provides appropriate synchronization between the main processor MPR and the auxiliary processor APR. Step ST8 constitutes a command-pickup operation. Steps ST8 and ST9 constitute a command-execution operation.

The system-program code SYS of the main processor MPR is complementary with the startup-program code SPC, which FIG. 4 illustrates. For example, the system-program code SYS may cause the main processor MPR to apply a reset signal to the auxiliary processor APR when a certain event occurs. This will initiate the execution of the startup-program code SPC. The system-program code SYS causes the main processor MPR to check the soft flag SFL as described hereinbefore with reference to FIG. 4. The system-program code SYS causes the main processor MPR to take appropriate action with respect to the startup-program code SPC when the soft flag SFL has been set. These operations, which have been described hereinbefore with reference to FIG. 4, include writing a command and attributes, if any, in the dual-port random-access memory DPRAM The startup-program code SPC, which FIG. 4 illustrates, and the system-program code SYS, which plays a complementary role, allow a relatively simple yet flexible download of the updated version of the application-program code APCi+1. For example, the main processor MPR applies a reset signal to the auxiliary processor APR when the main processor MPR has written the updated version of the application-program code APCi+1 into the dual-port random-access memory DPRAM, which FIG. 3 illustrates. In response, the auxiliary processor APR will execute the startup-program code SPC, which FIG. 4 illustrates.

The main processor MPR may take the following action when the auxiliary processor APR has carried out step ST5 for the first time in the execution of the startup-program code SPC. The main processor MPR writes a read command into address A[k] and writes the destination address DST@, the number of bytes to be read NBB, and the start address SRC@ into addresses A[k+1], A[k+2], and A[k+3], respectively. FIG. 3 illustrates this example.

Referring to FIG. 3, the start address SRC@ is address A[0] in the dual-port random-access memory DPRAM, which is a boundary of the range of addresses A[0] ... A[n] under which the updated version of the application-program code APCi+1 is stored. The number of bytes to be read NBB corresponds with a number of addresses comprised in the range A[0] ... A[n]. The destination address DST@ is an address in the application-program memory APM under which a first code in the updated version of the application-program code APCi+1 should be stored. Consequently, the read command causes the auxiliary processor APR to transfer the updated version of the application-program code APCi+1 from the dual-port random-access memory DPRAM to the application-program memory APM, which FIG. 2 illustrates.

The main processor MPR may take the following action when the auxiliary processor APR has carried out step ST5 for the second time in the execution of the startup-program code SPC. The main processor MPR writes a jump command into address A[k] and writes a jump address into address A[k+1]. The jump address corresponds with the aforementioned destination address DST@, which was an attribute of the read command. Consequently, the jump command causes the auxiliary processor APR to jump to the address in the application-program memory APM under which the first code of the updated version of the application-program code APCi+1 is stored. The auxiliary processor APR will execute the first code and will continue to execute further codes in the updated version, which has just been written into the application-program memory APM. The auxiliary processor APR will thus immediately run the updated version of the application-program code APCi+1.

It may happen that there is no need to store any updated version of the application-program code into the application-program memory APM when a reset has occurred. In that case, the main processor MPR may take the following action when the auxiliary processor APR has carried out step ST5 for the first time in the execution of the startup-program code SPC, which follows the reset. The main processor MPR writes a jump instruction under address A[k]. The jump instruction has a jump address as an attribute. The jump address is the address in the application-program memory APM under which the first code of the most recent version of the application-program code APC has previously been stored. In this example, the execution of the startup-program code SPC does not involve any data transfer via the dual-port random-access memory DPRAM.

CONCLUDING REMARKS

The detailed description hereinbefore with reference to the drawings illustrates the following characteristics, which are cited in claim 1. A data-processing arrangement (MPS) comprises a main processor (MPR) and an auxiliary processor (APR). A system-program code (SYS) causes the main processor to write an application-program code (APCi+1) into a shared memory (DPRAM). The system-program code further causes the main processor to write an address indication (SRC@), which indicates where the application-program code has been written into the shared memory, into a predefined memory location (A[k] ... A[k+3]). A startup-program code (SPC) causes the auxiliary processor to retrieve the address indication from the predefined memory location so as to subsequently transfer the application-program code from the shared memory to an application-program memory (APM), which belongs to the auxiliary processor.

The detailed description hereinbefore further illustrates the following optional characteristics, which are cited in claim 2. The system-program code (SYS) causes the main processor (MPR) to write an instruction (CMD) in association with the address indication (SRC@) into the predefined memory location (A[k] . . . A[k+3]). The startup-program code (SPC) of the auxiliary processor (APR) causes the auxiliary processor to read the instruction, which is associated with the address indication, from the predefined memory location so as to execute the instruction (this takes place in steps ST7-ST9, which FIG. 4 illustrates). These characteristics allow the startup-program code to have an even more generic nature, which further contributes to cost-efficiency and flexibility.

The detailed description hereinbefore further illustrates the following optional characteristics, which are cited in claim 3. The startup-program code (SPC) causes the auxiliary processor (APR) to provide an interrupt signal (this takes place in step ST5, which is illustrated in FIG. 4). The system-program code (SYS) causes the main processor (MPR) to respond to the interrupt signal by writing the instruction (CMD) and the address indication (SRC@) associated therewith, into the predefined memory location (A[k] . . . A[k+3]). These characteristics allow the startup-program code to have a yet more generic nature, which yet further contributes to cost-efficiency and flexibility.

The detailed description hereinbefore further illustrates the following optional characteristics, which are cited in claim 4. The system-program code (SYS) causes the main processor (MPR) to write a further address indication (DST@) into the predefined memory location (A[k] . . . A[k+3]). The further address indication indicates where the application-program code (APCi+1) should be written into the application-program memory. These characteristics allow the startup-program code to have a yet more generic nature, which yet further contributes to cost-efficiency and flexibility.

The detailed description hereinbefore further illustrates the following optional characteristics, which are cited in claim 5. The system-program code (SYS) causes the main processor (MPR) to write a jump instruction into the predefined memory location (A[k] . . . A[k+3]). The jump instruction is associated with the further address indication (DST@). The jump instruction causes the auxiliary processor (APR), via the startup-program code (SPC), to execute the application-program code (APCi+1) that the auxiliary processor has written into the application-program memory (APM). (This takes place in steps ST7-ST10, which FIG. 4 illustrates). These characteristics allow the startup-program code to have a yet more generic nature, which yet further contributes to cost-efficiency and flexibility.

The detailed description hereinbefore further illustrates the following optional characteristics, which are cited in claim 6. The startup-program code (SPC) comprises an initial instruction (ST[SFL], which is carried out in set ST3 illustrated in FIG. 4) that causes the auxiliary processor (APR) to provide a startup-commencement signal (the soft flag SFL is set), which signals the main processor (MPR) that the auxiliary processor has commenced to execute the startup-program code. These characteristics allow appropriate synchronization between respective operations that the main processor and the auxiliary processor carry out.

The detailed description hereinbefore further illustrates the following optional characteristics, which are cited in claim 7. The system-program code (SPC) causes the main processor (MPR) to provide a startup-continuation signal (the soft flag SFL is cleared). The startup-continuation signal signals the auxiliary processor (APR) that the main processor has received the startup-commencement signal and that the main processor has written the address indication (SRC@) into the predefined memory location. The startup-program code (SPC) causes the auxiliary processor (APR) to be in a waiting mode after the startup-commencement signal (this takes place in step ST6, which FIG. 4 illustrates). The auxiliary processor remains in the waiting mode until reception of the startup-continuation signal.

The aforementioned characteristics can be implemented in numerous different manners. In order to illustrate this, some alternatives are briefly indicated.

The shared memory may be a memory other than a dual-port random-access memory, which is merely an example. The shared memory may be, for example, a memory that uses a direct memory access (DMA) mechanism. The application-program code, which is downloaded, may replace a portion only of an earlier application-program code, which has previously been stored in the application-program memory. That is, the invention can be used to replace a few instructions only, which require debugging. The main processor and the auxiliary processor can be synchronized by means of one or more semaphores rather than flags.

There are numerous different applications for the invention. A cellular phone is merely an example. The invention may be applied in, for example, a base station or in the field of aeronautics. The invention is particularly suited for multiprocessor applications that have relatively complex embedded software.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

The remarks made herein before demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. A data-processing arrangement comprising: a main processor that has been provided with a system-program code that, when an application-program code needs to be replaced, that causes the main processor to write an updated application-program code into a shared memory, and that causes the main processor to write an address indication, which indicates where the application-program code has been written into the shared memory, into a predefined memory location or that causes the main processor, when the application program code does not need to be replaced, to write a jump instruction having a jump address as an address in the application-program code under which the first code of the most recent version of the application-program code has been previously stored; an auxiliary processor that has been provided with a startup-program code that causes the auxiliary processor to retrieve the address indication from the predefined memory location so as to subsequently transfer the application-program code from the shared memory to an application-program memory that belongs to the auxiliary processor, wherein the startup-program code causes the auxiliary processor to jump to the application-program code which is present in the application-program memory according to the jump instruction.

2. A data-processing arrangement as claimed in claim 1, wherein the system-program code causes the main processor to write an instruction in association with the address indication into the predefined memory location, and wherein the startup-program code of the auxiliary processor causes the auxiliary processor to read the instruction, which is associated with the address indication, from the predefined memory location so as to execute the instruction.

3. A data-processing arrangement as claimed in claim 2, wherein the startup-program code causes the auxiliary processor to provide an interrupt signal, and wherein the system-program code causes the main processor to respond to the interrupt signal by writing the instruction and the address indication associated therewith, into the predefined memory location.

4. A data-processing arrangement as claimed in claim 2, wherein the system-program code causes the main processor to write a jump instruction into the predefined memory location, the jump instruction being associated with the further address indication, the jump instruction causing the auxiliary processor, via the startup-program code, to execute the application-program code that the auxiliary processor has written into the application-program memory.

5. A data-processing arrangement as claimed in claim 1, wherein the system-program code causes the main processor to write a further address indication into the predefined memory location the further address indication indicating where the application-program code should be written into the application-program memory.

6. A data-processing arrangement as claimed in claim 1, wherein the startup-program code comprises an initial instruction that causes the auxiliary processor to provide a startup-commencement signal, which signals the main processor that the auxiliary processor has commenced to execute the startup-program code.

7. A data-processing arrangement as claimed in claim 6, wherein the system-program code causes the main processor to provide a startup-continuation signal, which signals that the auxiliary processor that the main processor has received the startup-commencement signal and that the main processor has written the address indication into the predefined memory location, and wherein the startup-program code causes the auxiliary processor to be in a waiting mode after the startup-commencement signal, the auxiliary processor remaining in the waiting mode until reception of the startup-continuation signal.

8. A communication apparatus comprising a data-processing arrangement as claimed in claim 1, and a transmitter-and-receiver circuit that is functionally coupled to the data-processing arrangement.

9. A method of downloading and/or running an application-program code in a data-processing arrangement that comprises a main processor and an auxiliary processor, the method comprising: a system-program-code execution step in which the main processor, when the application-program code needs to be replaced, writes an updated application-program code into a shared memory, and in which the main processor writes an address indication, which indicates where the application-program code has been written into the shared memory, into a predefined memory location or in which the main processor, when the application program code does not need to be replaced, writes a jump instruction having a jump address as an address in the application-program code under which the first code of the most recent version of the application-program code has been previously stored; a startup-program execution step in which the auxiliary processor retrieves the address indication from the predefined memory location and, subsequently, transfers the application-program code from the shared memory to an application-program memory that belongs to the auxiliary processor or in which the auxiliary processor jumps to the application-program code, which is present in the application-program memory, according to the jump instruction.

10. A computer-program product for a data-processing arrangement that comprises a main processor and an auxiliary processor, the computer-program product comprising: a system-program code that, when loaded into the main processor, causes the main processor, when an application program code needs to be replaced, to write an application-program code into a shared memory, and that causes the main processor to write an address indication, which indicates where the application-program code has been written into the shared memory, into a predefined memory location or that causes the main processor, when the application program code does not need to be replaced, to write a jump instruction having a jump address as an address in the application-program code under which the first code of the most recent version of the application-program code has been previously stored; and a startup-program code that, when loaded into a startup program memory, which belongs to the auxiliary processor, causes the auxiliary processor to retrieve the address indication from the predefined memory location and, subsequently, to transfer the application-program code from the shared memory to an application-program memory that belongs to the auxiliary processor or that causes the auxiliary processor to jump to the application-program code, which is present in the application-program memory, according to the jump instruction.

* * * * *